UNITED STATES PATENT OFFICE.

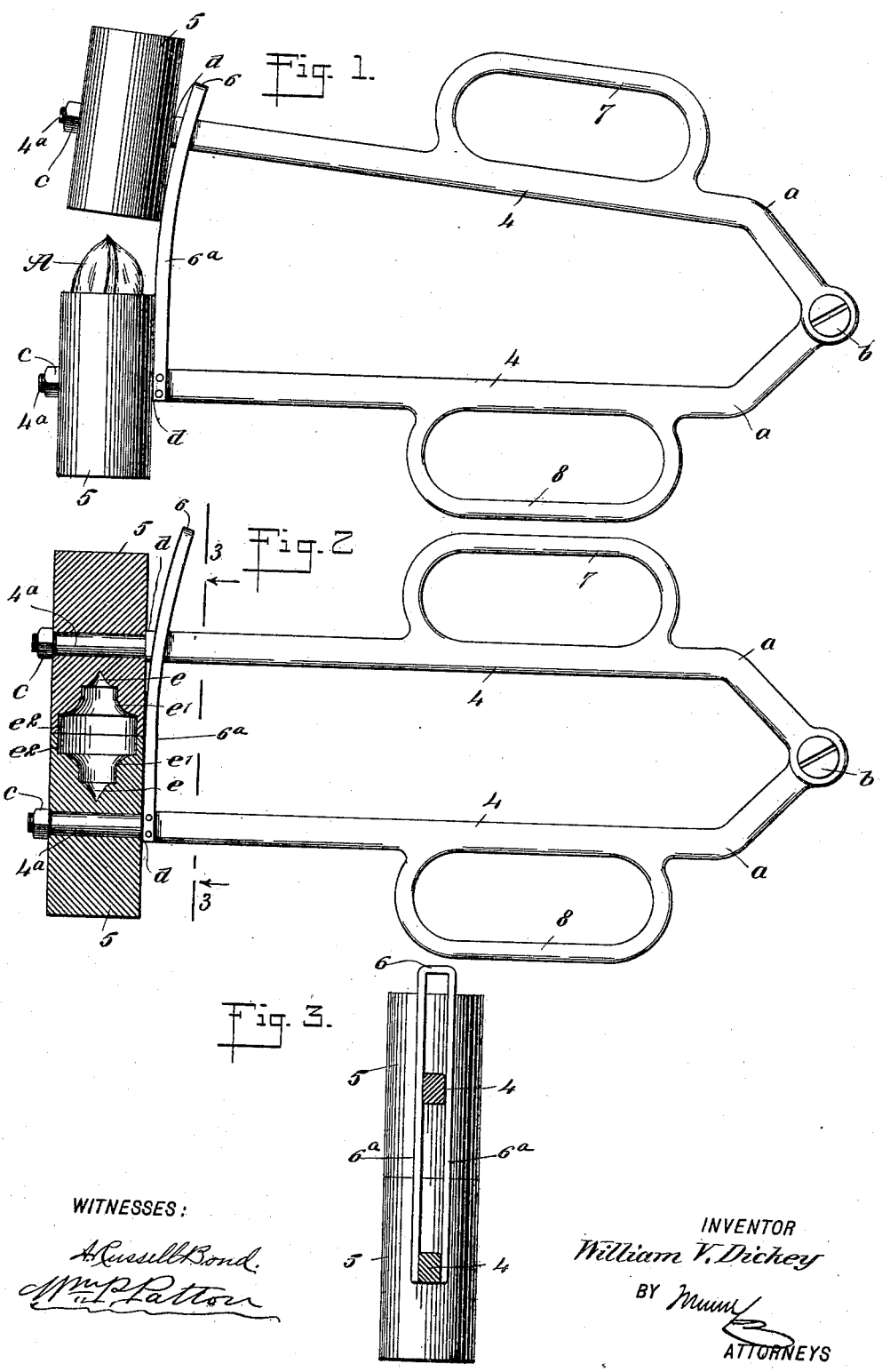

WILLIAM V. DICKEY, OF SAN ANTONIO, TEXAS.

NUT-CRACKER.

SPECIFICATION forming part of Letters Patent No. 696,805, dated April 1, 1902.

Application filed May 22, 1901. Serial No. 61,372. (No model.)

*To all whom it may concern:*

Be it known that I, WILLIAM V. DICKEY, a citizen of the United States, and a resident of San Antonio, in the county of Bexar and State of Texas, have invented a new and Improved Nut-Cracking Implement, of which the following is a full, clear, and exact description.

This invention has for its object to provide a novel, simple, and practical nut-cracking tool which may be conveniently manipulated for breaking the shells of pecan-nuts more particularly, but which may also be employed for cracking other nuts.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the implement, illustrating its use. Fig. 2 is a partly-sectional side view of the same in closed condition, and Fig. 3 is a transverse sectional view substantially on the line 3 3 in Fig. 2.

Two handle-limbs 4 4, of like form, are provided, which have bends $a$ formed thereon, which dispose the inner ends of the limbs so that they may be lapped and pivoted together, as shown at $b$. At the opposite ends of the handle-limbs said parts are reduced in diameter to provide shanks $4^a$ $4^a$ thereon, and preferably a nut $c$ is screwed upon the free threaded end of each shank, as shown best in Fig. 2. Two similar hammer-blocks 5 5 are respectively mounted on the shanks $4^a$ and are thereon firmly held by the nuts $c$. As shown, the hammer-blocks 5 are preferably of metal and in cylindrical form, having suitable dimensions and flattened end walls. The shanks $4^a$ by their formation produce shoulders $d$ where they project from the handle-limbs, and each of the hammer-blocks 5 has a transverse perforation in it, between the end walls thereof, through which perforations the shanks $4^a$ are inserted until the hammer-blocks engage the shoulders $d$, which will permit the threaded free end portions of said shanks to project at the opposite or outer sides of the hammer-blocks for the reception of the nuts $c$, which when properly adjusted will secure the hammer-blocks upon the handle-limbs in an obvious manner.

While the device is particularly well adapted for fracturing the shells of pecan-nuts, so as to release the meats or kernels therefrom without injuring the kernels, it may also be employed for cracking hickory-nuts, walnuts, or filberts, and in each case the hammer-blocks 5 are provided with mating cavities in adjacent ends, wherein the nuts are to be separately placed when operated upon for fracturing their shells.

The drawings represent a form for the cavities in the ends of the hammer-blocks 5, each designed specially for reception of an end portion of a pecan-nut A, which nuts are elongated and coniform at the ends.

In order to bring pressure upon the shell of a pecan-nut at a point near each end of the same, the cavities $e$ in adjacent ends of the hammer-blocks 5 are each preferably shaped as shown in Fig. 2, a convexity $e'$ being produced therein at a proper distance from the wider edge portion of said cavity.

Upon one handle-limb 4 a guide 6 is secured, consisting of a looped bar, the parallel members $6^a$ of which have their ends oppositely secured upon respective sides of the limb 4 from which they project. Between the members $6^a$ of the guide 6 the other handle-limb 4 is loosely held, the guide preventing improper lateral movement of the handle-limbs, so that the ends of the hammer-blocks 5 having the cavities $e$ therein will be oppositely disposed and always close truly upon each other.

At a suitable point the thumb and finger holds 7 8 are formed or secured oppositely upon the handle-limbs 4, these formations being suitably elongated to adapt them for the free reception of the thumb and three fingers of the operator's hand, and it will be seen that when the handle-limbs are properly grasped by engagement of the hand with the looped formations 7 8 by an opening or closing movement of the engaged hand the hammer-blocks 5 may be correspondingly actuated.

In use, the implement being grasped as explained, the operator places a pecan-nut in the cavity $e$ in one hammer-block 5 and by manipulation brings the other hammer-block close to the one carrying the pecan-nut, so that the nut will be loosely held between the hammer-blocks in the opposed cavities $e$ and in contact with the convexities $e'$. The operator now strikes the poll end of one of the hammer-blocks upon any solid body, the blow being graduated in force, so as to be just sufficient to crack the shell of the gripped nut, which will be released by an opening movement of the operator's hand.

It has been found that by use of the improved nut-cracking implement the shells of pecan-nuts and other nuts may be expeditiously fractured so as to release their kernels, and by a little practice these edible portions of the nuts may be separated from the shells intact, or at least only bisected, without injury to either half portion of a kernel.

In case the implement is applied for use in cracking hickory-nuts, these nuts, being generally in the form of flattened spheroids, may be placed in the wider circular edge portions $e^2$ of the cavities $e$, and the shells of such nuts may with equal facility be fractured by using the implement as already described.

It will be observed that the nuts are not cracked by muscular exertion, and any small child can use the improved nut-cracker without tiresome labor.

Having described my invention, I claim as new and desire to secure by Letters Patent—

1. A nut-cracking implement, comprising a pair of similarly-bent handle-limbs pivoted together at like ends, a hammer-block rigidly secured on the opposite end of each limb, each hammer-block having a cavity, said cavities being in the ends of the blocks that may have contact with each other, and a guide device on one handle-limb near the hammer-blocks and adapted to guide the other limb.

2. A nut-cracking implement, comprising a pair of similarly-bent handle-limbs, pivoted together near the bends of the limbs, a hammer-block rigidly held on the opposite end of each handle-limb, each hammer-block having a cavity, said cavities being formed in opposed ends of the hammer-blocks, a handhold in each handle-limb, and a guide-piece having parallel members affixed by their ends on one of the handle-limbs, and loosely embracing the other handle-limb.

In testimony whereof I have signed my name to this specification in the presence of two subscribing witnesses.

WILLIAM V. DICKEY.

Witnesses:
Mrs. G. C. SMITH,
A. W. SMITH.